J. W. DE CAMP.

GLASS CASKET.

APPLICATION FILED DEC. 15, 1916.

Reissued Sept. 11, 1917.

14,357.

2 SHEETS—SHEET 1.

Inventor

J. W. DeCamp

By

Chas. A. Tracey, Attorneys.

J. W. DE CAMP.

GLASS CASKET.

APPLICATION FILED DEC. 15, 1916.

Reissued Sept. 11, 1917.

14,357.

2 SHEETS—SHEET 2.

Inventor

J. W. DeCamp.

By

Attorneys

UNITED STATES PATENT OFFICE.

JAMES W. DE CAMP, OF BLACKWELL, OKLAHOMA, ASSIGNOR OF ONE-FOURTH TO JOHN P. MILLER, OF McALLEN, TEXAS, AND ONE-FOURTH TO CHARLES E. DE CAMP, OF BLACKWELL, OKLAHOMA.

GLASS CASKET.

14,357. Specification of Reissued Letters Patent. Reissued Sept. 11, 1917.

Original No. 1,123,856, dated January 5, 1915, Serial No. 794,661, filed October 11, 1913. Application for reissue filed December 15, 1916. Serial No. 137,220.

*To all whom it may concern:*

Be it known that I, JAMES W. DE CAMP, a citizen of the United States of America, residing at Blackwell, in the county of Kay and State of Oklahoma, have invented certain new and useful Improvements in Glass Caskets, of which the following is a specification.

The present invention relates to new and useful improvements in burial caskets and aims particularly to provide an article of this nature which consists of a glass body and lid, each bound by a metallic frame.

One of the principal objects is to provide a metallic binding or retaining frame constructed in such a manner and adapted for such application as will make it possible to manufacture the casket from relatively thin glass without incurring the liability of breakage of the glass during the handling of the article in transit and in the burial period.

A further object of equal importance with the foregoing, resides in the provision of the metallic binding frames, so constructed that the hinges employed in securing the lid or closure to the body of the casket are secured to metal strips, thus eliminating the necessity of boring holes in the glass for the reception of bolts or screws. In this connection, it may be well to observe that one of the principal difficulties heretofore encountered in the manufacture of glass caskets has been the fact that the application of hinges to the lid and body necessitates the boring of holes or apertures for pins, bolts, or screws, the result being that the glass parts are more susceptible to cracking or fracture than they would be were there no holes drilled in them.

A yet further object contemplates the provision of a pair of bracing frames which are preferably constructed of soft wood and are arranged in the body and lid of the casket, acting not only to strengthen the glass body of the casket but also to provide means for attaching a fabric lining.

The above and additional objects are accomplished by such means as are illustrated in the accompanying drawings, described in the following description and then more particularly pointed out in the claims, which are appended hereto and form a part of this specification.

With reference to the drawings, wherein there has been illustrated the preferred embodiment of the invention as it is reduced to practice and throughout the several views of which similar reference numerals designate corresponding parts, Figure 1 is a perspective view of the casket with the lid in closed position;

Fig. 4 is a detailed sectional perspective view of one corner of the body of the casket, looking at the interior thereof.

Figure 1:
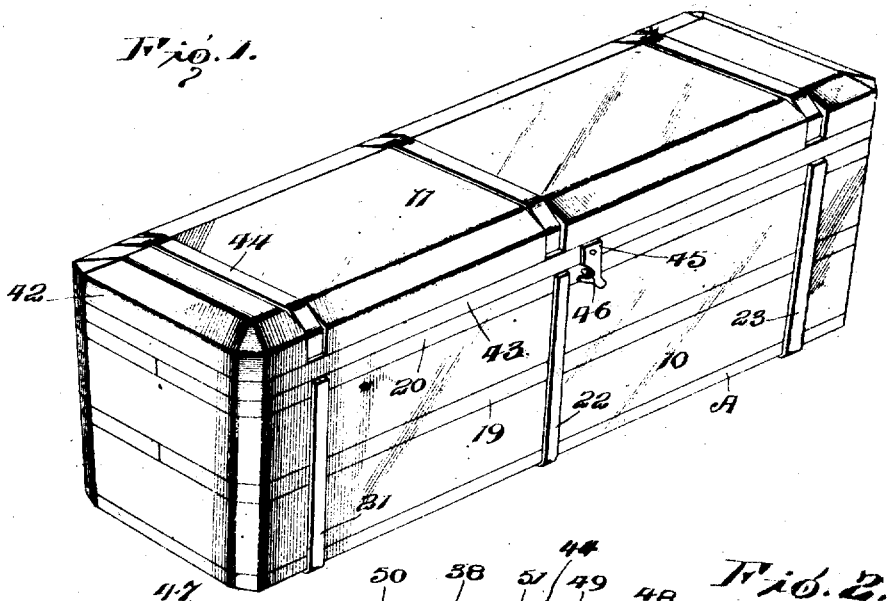

Proceeding now to the description of the drawing, the numerals 10 and 11 designate respectively and as entireties, the body portion and lid which constitute the casket.

The body portion 10 is preferably in the usual form of an elongated box. This box or body 10 is, as indicated above, formed of glass and includes a bottom wall 12, side walls 13 and 14 and end walls 16 and 17. While the preferred form of this invention is constructed mainly of glass, it will, of course, be understood that any similar composition of a transparent or opaque nature may be substituted, without departing from the spirit of this invention. In practice it has been found preferable to cast the side walls 13 and 14 and end walls 16 and 17 and bottom wall 12 in a one piece structure, using for the purpose any suitable mold of the usual type.

Figure 2:
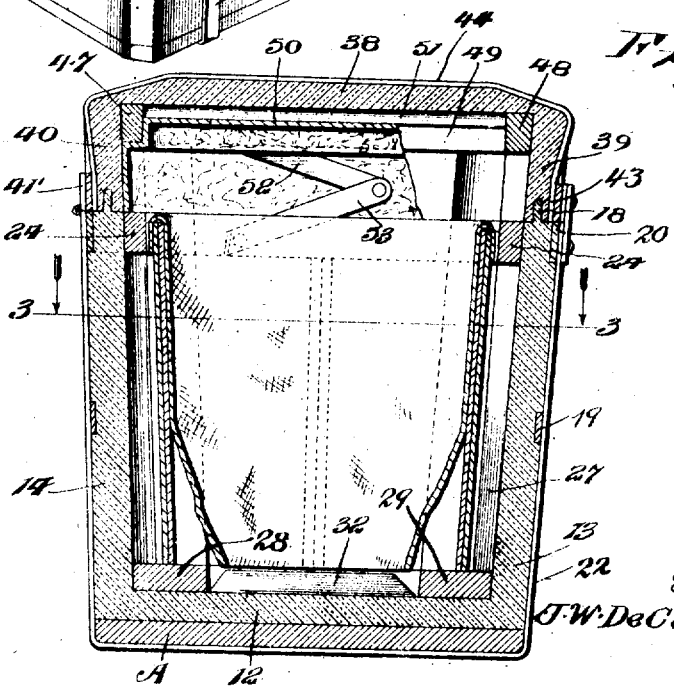
Fig. 2 is a transverse section.
Figures 1, 3:
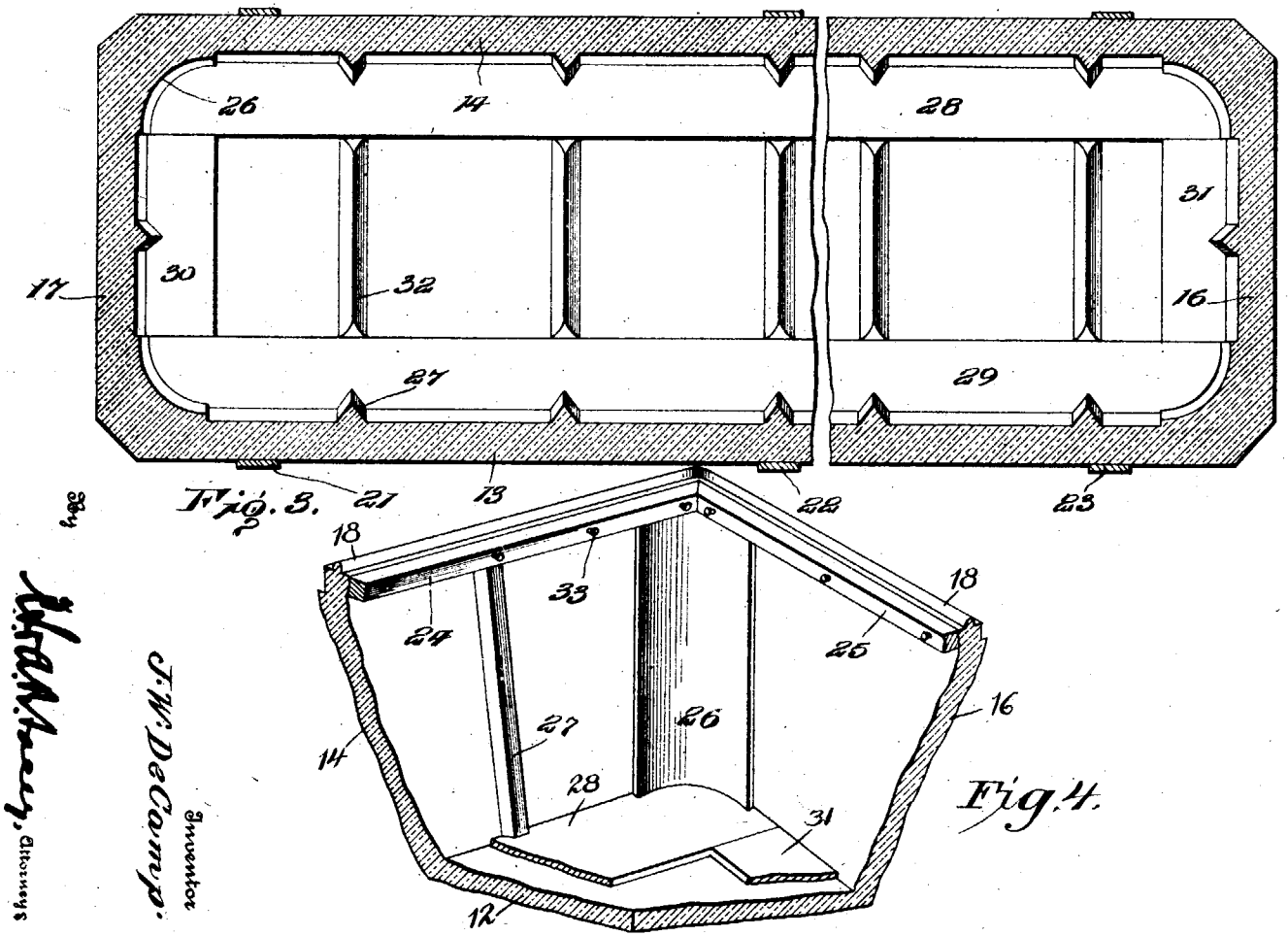
Fig. 3 is a horizontal section taken longitudinally of the casket on the line 3—3 of Fig. 2.

A peripheral rib or tongue 18 is formed on the upper edges of the end and side walls, as will be discerned upon reference to Fig. 2. This rib is adapted to seat in a peripheral groove formed in the lower edge of the lid walls as will be hereinafter more fully described.

As hereinbefore set forth, the present invention aims to provide a simple but efficient metallic binding frame which is applicable to the body of the casket and is so constructed that it will not only serve to brace the various walls of the casket body but will also form a means for securing the hinges of the top. The preferred form of metallic binding frame consists of a pair of metallic straps 19 and 20 which encircle the side and end walls in a horizontal plane, being longitudinally disposed and three transversely extending metallic straps 21, 22 and 23, which are spaced longitudinally and are soldered, welded, riveted or otherwise secured in any desired or suitable manner to the longitudinal frame members 19 and 20. Interpolating briefly, it may be well to set forth that the most satisfactory material from which the binding straps or frame members may be made has been found to be nickeled brass, but it is, of course, obvious that any other suitable metal may be employed. The side and end walls are preferably formed with grooves for the reception of the longitudinal encircling metallic straps 19 and 20, the purpose being to hold the frame composed of the members 19, 20, 21, 22 and 23 against displacement, without necessitating the application of bolts, screws, rivets or any other fastening devices to the glass walls of the casket.

In order to guard against breakage of the bottom wall when the casket is being moved from place to place, as in transit or in the burial period, there has been provided a wooden bottom indicated at A. This wooden bottom is in shape substantially similar to the bottom wall 12 of the casket body and is, of course, held in the desired position against the bottom wall 12 by means of the metallic binding frame above described. Upon reference to Fig. 2, it will be apparent that this wooden bottom A serves as a buffer for the bottom wall and may be rested on metallic supports, on the ground or any other relatively hard surface without endangering the glass bottom of the casket body.

As has been previously explained, I provide in connection with the body box a pair of wooden internal bracing frames. The upper frame is formed from two side strips, one of which is indicated at 24, in Fig. 4, and a pair of end strips which are indicated at 25 in Fig. 4. This frame is mounted on the upper terminals of the spacing ribs or strips 26 and the intermediate spacing strips 27. These members 26 and 27 are formed of glass and are cast with the side walls of the casket. The lower frame consists of a pair of side boards 28 and 29 and end boards 30 and 31. As a means for strengthening the bottom wall of the casket body, there have been formed upon the upper face of this bottom wall and interiorly of the casket, a number of transversely extending, longitudinally spaced ribs which, as indicated at 32, terminate at each end at the adjacent edge of the side boards 28 and 29, thus serving to hold the side boards in the desired engagement against the side walls of the casket. A number of studs or pins 33 are carried by the side and end members of the upper frame and project into the body box 10, so that a fabric lining may be detachably applied.

Passing now to the description of the preferred form of lid, this element of the casket includes a top slab 38, side walls 39 and 40 and end walls 41 and 42. These members may be molded as an entirety or be made separately as is found most expedient, although the preferred form employs a one-piece structure. As previously set forth, a peripheral groove is formed on the lower edge of the side and end walls to receive the tongue 18 of the body member 10.

As a means for bracing the lid and permitting the hinges 41′ to be attached to metal straps instead of the glass walls, a metallic binding frame has been provided for the top as well as for the body of the casket. This metallic binding frame of the casket top consists of a metallic strap 43 which encircles the side and end walls in a longitudinal direction and a number of transversely extending straps 44. The member 43 is seated in a groove extending around the side and end walls of the top to prevent its accidental displacement, and the transverse metallic straps 44 are longitudinally spaced and disposed on the upper face of the closure 11 with their terminals seated in the grooves formed in the side walls and are soldered or otherwise secured to the horizontal strap 43 whereby they are held against longitudinal and horizontal movement. A suitable catch indicated at 45 is pivoted on the member 43 and is arranged for engagement with the keeper stud 46 carried by the strap 20 of the body binding frame. A bracing frame including a pair of wooden side strips 47 and 48 and a pair of end strips, one of which is indicated at 49, is arranged interiorly of the lid 11 and not only serves to brace the walls of the lid but also to receive a cloth lining indicated at 50. Since the top 38 is formed from a slab of glass, it has been necessary to provide some means for imparting the required rigidity to the top so that it will not be liable to break by reason of its own weight. To accomplish this end, the present invention provides a number of transversely extending ribs which, as indicated at 51, are formed on the top slab 38 and are cast therewith. These ribs 51 terminate at each end at such a point that they will act to hold the side frame members 47 and 48 in desired engagement against the side walls of the top of the casket. It will be further noted that these ribs act to space the lining uniformly from the top slab 38. A brace consisting of a pair of pivotally connected bar members 52 and 53 is terminally pivoted to the end frame members of the body and lid internal wooden frames for the obvious purpose of holding the lid in raised position.

In reduction to practice, I have found that the form of my invention illustrated in the drawings and referred to in the above description as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to when required without sacrificing any of the advantages of my invention, as defined in the appended claims.

What I claim is:

1. In a device of the character described, a body box, a binding frame for the box, a closure, a binding frame for the closure, hinges applied to the binding frames for attaching the closure to the body member, an internal bracing frame arranged in the body member, means carried by the said frame, for the attachment and support of a fabric lining, and an internal bracing frame arranged in the closure.

2. In a device of the character described, a body member, an exterior binding frame for the body member, a closure, a binding frame for the closure, hinges secured to the binding frames of the body member and closure for attaching the closure to the body member, vertically extending spaced reinforcing ribs on the inner face of the body member and having their terminals spaced from the upper edge and bottom wall thereof, a bracing frame mounted on the bottom wall of the body member and engaging against the side and end walls thereof, and a second internal bracing frame removably mounted on the upper terminals of the said ribs and engaging against the side and end walls of the body member, and studs carried by said second-mentioned frame whereby a fabric lining may be suspended in the body member.

3. In a device of the character described, a body member, a binding frame for the body member, a closure, a binding frame for the closure, hinges secured to the binding frames of the body member and closure for attaching the closure to the body member, a plurality of transversely extending longitudinally spaced reinforcing ribs on the inner face of the closure, the terminals of the ribs being spaced from the sides of the closure, a substantially rectangular bracing frame arranged in the closure and having its side members disposed between the terminals of the ribs and the sides of the closure, a plurality of reinforcing ribs formed on the side and end walls of the body member and on the inner face thereof, said reinforcing ribs being vertically arranged and longitudinally spaced and having their upper and lower terminals respectively spaced from the upper edge and bottom wall of the body member, a bracing frame arranged on the upper terminals of the reinforcing ribs and engaging against the side and end walls of the body member, a second substantially rectangular internal bracing frame mounted on the bottom wall of the body member and engaging against the side and end walls thereof, the outer edges of the second-mentioned frame being disposed between the lower terminals of the body member reinforcing ribs and the bottom wall of the body member.

4. In a device of the character described, a body member, reinforcing ribs on the inner face of the body member having their terminals spaced from the upper edge and bottom wall thereof, a bracing frame mounted above the bottom wall of the body member against the side and end walls thereof, and a second internal bracing frame mounted on the upper terminals of said ribs and bearing against the side and end walls of the body member.

5. In a device of the character described, a body member, ribs on the upper face of the bottom wall of the body member having their terminals spaced from the side walls of the body member, and an internal bracing frame mounted on the bottom wall of the body member against the side walls of the same and against the terminals of said ribs.

6. In a device of the character described, a body member, reinforcing ribs formed on the inner face of the body member having their terminals spaced from the upper edge and bottom wall thereof, ribs formed on the upper face of the bottom wall of the body member having their terminals spaced from the side walls of the body member, an internal bracing frame mounted on the bottom wall of the body member against the side and end walls of the same and between and against the terminals of the first and second mentioned ribs, and a second internal bracing frame mounted on the upper terminals of the vertical ribs and bearing against the side and end walls of the body member.

7. A casket including a glass body having a groove extending horizontally around the outer surfaces of its walls at the upper portion thereof, a continuous binding element seated in said groove and extending about the walls, and a second binding element secured to the first mentioned binding element and extending downwardly beside the walls of the body and beneath the bottom thereof, engagement of the binding element in said groove serving to anchor and support said element therein and permit the second mentioned binding element to fit tightly around said body.

8. A casket including a transparent body and a transparent lid therefor, an external binding frame for the body, an external binding frame for the lid, means for holding the external binding frames against displacement, hinges applied to said frames for connecting the body and lid, an internal bracing frame for the body, and an internal bracing frame for the lid, the internal bracing frames extending over a minor portion of the area of the walls of the body and lid whereby to permit a substantially unobstructed view through the said walls, the external binding frame for the lid carrying said lid when opening and closing the casket.

9. A casket including a glass body formed in the outer surfaces of its walls at its upper portion with a groove extending continuously around the body, a binding frame for the body including a binding strap extending longitudinally and continuously around the walls of the body and seating in said groove, and a plurality of binding straps secured at their ends to the first-mentioned strap and extending downwardly beside the side walls of the body and transversely beneath the bottom thereof and located wholly exteriorly of the body, a glass lid for the body, a binding frame for the lid permanently held thereon, and hinge connection between the first-mentioned strap of the body binding frame and the frame for the lid, the frame for the lid carrying said lid when opening and closing the casket.

10. A casket including a glass body and a glass lid therefor, the body being formed in the exterior surfaces of its walls with a groove extending continuously around the upper edge portion of the body, the lid being formed in the exterior surfaces of its walls with a groove extending continuously around the lower edge portion of the lid, a binding strap extending continuously around the body and seating in the groove formed therein, binding straps secured at their ends to the first-mentioned straps and extending downwardly beside the side walls of the body and transversely beneath the bottom thereof, a binding strap extending continuously around the lid and seating in the groove formed therein, and binding straps secured to said first-mentioned binding strap for the lid and extending across the exterior of the lid.

11. A casket including a glass body and a glass lid therefor, a binding element extending continuously around the upper portion of the body, a binding element extending continuously around the lower portion of the lid, the binding element of the lid being permanently held upon said lid, and direct hinge connection between said elements, the binding element upon the lid carrying said lid when opening and closing the casket.

12. A casket including a glass body and a glass lid therefor, a strap extending continuously around the side and end walls of the body near the upper portion thereof, a strap extending continuously around the side and end walls of the lid near the lower portion thereof, said straps being respectively permanently held upon the body and lid, and a hinge connection between said straps, the strap upon the lid carrying said lid when opening and closing the casket.

13. A casket including a glass body having a groove extending horizontally around the outer surfaces of its walls at the upper portion thereof, a continuous binding element seated in said groove and extending about the walls, a second binding element secured to the first mentioned binding element and extending downwardly beside the walls of the body and beneath the bottom thereof, and a glass lid for the body having a groove extending horizontally around the outer surfaces of its walls at the lower portion thereof, a continuous binding element seating in the said groove in the lid and extending about the walls of said lid, and a second binding element for the lid secured to the first mentioned element and extending transversely across said lid, the engagement of the horizontal binding elements for the body and lid in their respective grooves serving to prevent displacement of all of said binding elements.

In testimony whereof I hereto affix my signature.

JAMES W. DE CAMP. [L. S.]